(12) United States Patent
Satterthwaite et al.

(10) Patent No.: US 9,981,500 B2
(45) Date of Patent: May 29, 2018

(54) IMPACT RESISTANT RIM

(71) Applicant: ENVE Composites, LLC, Ogden, UT (US)

(72) Inventors: Brett Satterthwaite, Ogden, UT (US); Elias Harik, Ogden, UT (US)

(73) Assignee: ENVE Composites, LLC, Ogden, UT (US)

( * ) Notice: Subject to any disclaimer, the term of this patent is extended or adjusted under 35 U.S.C. 154(b) by 160 days.

(21) Appl. No.: 14/560,345

(22) Filed: Dec. 4, 2014

(65) Prior Publication Data

US 2016/0159141 A1 Jun. 9, 2016

(51) Int. Cl.

| | |
|---|---|
| *B60B 5/02* | (2006.01) |
| *B60B 21/00* | (2006.01) |
| *B60B 21/04* | (2006.01) |
| *B60B 21/02* | (2006.01) |
| *B60B 21/10* | (2006.01) |
| *B29C 70/30* | (2006.01) |
| *B60B 21/06* | (2006.01) |
| *B29K 105/08* | (2006.01) |
| *B29L 31/32* | (2006.01) |
| *B29K 621/00* | (2006.01) |
| *B29C 70/86* | (2006.01) |

(52) U.S. Cl.
CPC ............... *B60B 5/02* (2013.01); *B60B 21/00* (2013.01); *B60B 21/025* (2013.01); *B60B 21/04* (2013.01); *B60B 21/10* (2013.01); *B29C 70/30* (2013.01); *B29C 70/865* (2013.01); *B29K 2105/0872* (2013.01); *B29K 2621/00* (2013.01); *B29L 2031/32* (2013.01); *B60B 21/062* (2013.01); *B60B 21/106* (2013.01); *B60B 2360/3416* (2013.01); *B60B 2900/131* (2013.01)

(58) Field of Classification Search
CPC ........... B60B 5/02; B60B 21/00; B60B 21/04; B60B 21/025; B60B 21/10
USPC ....................................... 301/95.107, 95.102
See application file for complete search history.

(56) References Cited

U.S. PATENT DOCUMENTS

| | | | | |
|---|---|---|---|---|
| 2,609,856 | A * | 9/1952 | Paton | B60B 9/12 152/48 |
| 4,173,992 | A * | 11/1979 | Lejeune | B60B 5/02 152/381.3 |
| 4,429,068 | A * | 1/1984 | Nakahira | A43B 13/181 152/310 |
| 5,061,013 | A | 10/1991 | Hed et al. | |
| 5,538,058 | A * | 7/1996 | Aloy | B60B 21/12 152/381.5 |

(Continued)

FOREIGN PATENT DOCUMENTS

RU       2 096 188 C1    11/1997

*Primary Examiner* — Kip T Kotter
*Assistant Examiner* — Scott A Browne
(74) *Attorney, Agent, or Firm* — Woodard, Emhardt, Moriarty, McNett & Henry LLP

(57) ABSTRACT

A impact resistant rim is configured to soften or minimize an impact, thereby reducing the risk of pinching or otherwise flattening the tire and/or damaging the rim. This impact resistant rim further reduces the effects of an impact by maintaining the integrity of the rim during and following the impact. In this rim design, a shock absorbing cord is inlaid, molded, an/or otherwise embedded inside opposing leading edges of the rim. The shock absorbing cord is designed to elastically and/or plastically deform during an impact.

29 Claims, 7 Drawing Sheets

(56) References Cited

U.S. PATENT DOCUMENTS

| | | | | |
|---|---|---|---|---|
| 5,820,709 A * | 10/1998 | Matsuda | B60B 21/10 | |
| | | | 152/383 | |
| 6,216,758 B1 | 4/2001 | Chen | | |
| 6,347,839 B1 * | 2/2002 | Lew | B29C 70/345 | |
| | | | 301/95.102 | |
| 6,732,775 B1 * | 5/2004 | Kikuchi | B60B 9/10 | |
| | | | 152/47 | |
| 6,767,070 B1 * | 7/2004 | Chiang | B60B 1/041 | |
| | | | 301/58 | |
| 6,991,300 B2 * | 1/2006 | Colegrove | B60B 5/02 | |
| | | | 188/24.13 | |
| 7,431,404 B2 * | 10/2008 | Senoo | B60B 1/041 | |
| | | | 301/104 | |
| 7,918,514 B2 * | 4/2011 | Dal Pra' | B60B 5/02 | |
| | | | 116/208 | |
| 7,934,778 B2 * | 5/2011 | Denk | B60B 5/02 | |
| | | | 301/95.103 | |
| 8,366,202 B2 * | 2/2013 | Poertner | B60B 5/02 | |
| | | | 301/95.102 | |
| 8,882,207 B2 * | 11/2014 | Matsui | B60B 5/02 | |
| | | | 301/95.103 | |
| 8,888,195 B1 | 11/2014 | Hed et al. | | |
| 2004/0021366 A1 * | 2/2004 | Colegrove | B60B 5/02 | |
| | | | 301/64.703 | |
| 2004/0227393 A1 * | 11/2004 | Meggiolan | B29C 70/446 | |
| | | | 301/95.102 | |
| 2005/0062337 A1 * | 3/2005 | Meggiolan | B29C 70/446 | |
| | | | 301/95.102 | |
| 2006/0181140 A1 | 8/2006 | Mercat et al. | | |
| 2007/0194619 A1 * | 8/2007 | Colegrove | B60B 5/02 | |
| | | | 301/95.101 | |
| 2007/0205654 A1 * | 9/2007 | Denk | B60B 5/02 | |
| | | | 301/95.102 | |
| 2008/0315676 A1 * | 12/2008 | Cobb | B60B 5/02 | |
| | | | 301/95.102 | |
| 2009/0250994 A1 * | 10/2009 | Meggiolan | B60B 5/02 | |
| | | | 301/95.106 | |
| 2010/0289232 A1 * | 11/2010 | Daghini | B60C 9/2009 | |
| | | | 280/29 | |
| 2011/0018336 A1 | 1/2011 | Mercat et al. | | |
| 2011/0057505 A1 * | 3/2011 | Nagata | B60B 1/06 | |
| | | | 301/95.102 | |
| 2012/0025597 A1 * | 2/2012 | Koshiyama | B60B 1/003 | |
| | | | 301/95.102 | |
| 2013/0043717 A1 | 2/2013 | Poertner et al. | | |
| 2013/0057050 A1 * | 3/2013 | Matsui | B60B 5/02 | |
| | | | 301/95.102 | |
| 2014/0042798 A1 * | 2/2014 | Iwai | B60B 5/02 | |
| | | | 301/95.102 | |
| 2014/0292061 A1 * | 10/2014 | Lew | B60B 21/023 | |
| | | | 301/55 | |

* cited by examiner

IMPACT RESISTANT RIM

BACKGROUND

Getting a flat tire can ruin even the most perfect day for a bike ride. For competitive bicycle racers, a flat tire may be the difference between winning and losing a race, and while riding at high speeds, a flat tire can be even dangerous. There are many sources for flat tires in bicycles, such as underinflated tires and punctures by sharp objects. One common source for a flat is commonly referred to as a snake bite or a pinched tire. When the tire is temporarily collapsed by impacting a rock, curb, pothole, or other impediment, the tire and/or inner tube is caught between the impediment is such a manner that the rim often cuts the tire or tube, thereby leading to a flat. Thus, there is a need for improvement in this field.

SUMMARY

A unique impact resistant rim is configured to soften or minimize an impact, thereby reducing the risk of pinching or otherwise flattening the tire and/or damaging the rim. In addition, this rim design further reduces the effects of an impact by maintaining the integrity of the rim during and following the impact. In this unique rim design, a shock absorbing cord is inlaid, molded, or otherwise integrally embedded inside opposing leading edges of the rim. The shock absorbing cord is designed to elastically and/or plastically deform during an impact. In one example, the shock absorbing cord is made of an elastomer material, such as rubber and/or silicone, but in other examples, the shock absorbing cord can be made of other types of shock absorbing materials. This design not only reduces the risk of a flat tire but also provides significant strength for supporting the sidewalls of the tire. In one example, the rim is formed from a composite material, such as carbon fiber material, but the rim can be made from other materials. A cover material that is more stretchable or extendable than carbon fibers, such as polyester, fiberglass, and/or aramid materials, is wrapped around the elastomer cord. The cover material is configured to protect the cords from being cut or sliced during an impact. In addition, due to its stretchy nature, the cover material helps to maintain the integrity of the rim from the impact as well as dissipate the energy from the impact. In another variation, the two or more elastomer cords are molded into each leading edge of the rim. While not certain, it is theorized that this shock absorbing cord provides some type of dampening or shock absorbing capability that in turn reduces the risk of pinching the tube as well as propagation of cracks in the rim.

Aspect 1 concerns an apparatus, including a bicycle rim including a leading edge, and a shock absorbing cord embedded inside the leading edge.

Aspect 2 concerns the apparatus of aspect 1, wherein the bicycle rim is at least in part made of a composite material.

Aspect 3 concerns the apparatus of aspect 2, wherein the composite material includes carbon fiber material.

Aspect 4 concerns the apparatus of aspect 2, wherein the shock absorbing cord is at least in part made of rubber.

Aspect 5 concerns the apparatus of aspect 2, wherein the rim further includes a cover layer covering the shock absorbing cord.

Aspect 6 concerns the apparatus of aspect 5, wherein the cover layer is more stretchable than the composite material.

Aspect 7 concerns the apparatus of aspect 6, wherein the cover layer is made of material selected from a group consisting of polyester, fiberglass, Kevlar®, and aramid materials.

Aspect 8 concerns the apparatus of aspect 5, further including the rim including a spoke face, a sidewall extending from the leading edge to the spoke face, and a tire channel defined at least in part by the sidewall; and a tire received in the tire channel, wherein the cover layer contacts the tire, wherein the cover layer is located between the shock absorbing cord and the tire.

Aspect 9 concerns the apparatus of aspect 5, wherein the cover layer has fibers oriented at 45 degrees relative to the shock absorbing cord.

Aspect 10 concerns the apparatus of aspect 1, wherein the rim further includes a cover layer covering the shock absorbing cord.

Aspect 11 concerns the apparatus of aspect 1, wherein the rim further includes a second shock absorbing cord embedded in the leading edge.

Aspect 12 concerns the apparatus of aspect 1, wherein the shock absorbing cord extends in a continuous manner around the rim.

Aspect 13 concerns the apparatus of aspect 1, wherein the shock absorbing cord extends in a discontinuous manner around the rim.

Aspect 14 concerns the apparatus of aspect 1, wherein the rim is a clincher type rim.

Aspect 15 concerns the apparatus of aspect 1, wherein the rim is a tubeless type rim.

Aspect 16 concerns the apparatus of aspect 1, further including a hub; and one or more spokes connecting the rim to the hub.

Aspect 17 concerns the apparatus of aspect 16, further including a tire secured to the rim; and a bicycle attached to the hub.

Aspect 18 concerns a method including layering one or more plies of fiber reinforced material; placing a shock absorbing cord on the plies of the fiber reinforced material; covering the shock absorbing cord with a cover layer; and forming the plies into a bicycle rim.

Aspect 19 concerns the method of aspect 18, wherein the cover layer is made of a material more stretchable than the fiber reinforced material.

Aspect 20 concerns the method of aspect 18, further including curing the plies.

Aspect 21 concerns the method of aspect 18, wherein said covering includes covering the shock absorbing cord with a cover ply having fibers oriented at a 45° angle relative to the shock absorbing cord.

Further forms, objects, features, aspects, benefits, advantages, and embodiments of the present invention will become apparent from a detailed description and drawings provided herewith.

DETAILED DESCRIPTION

Figure 1:
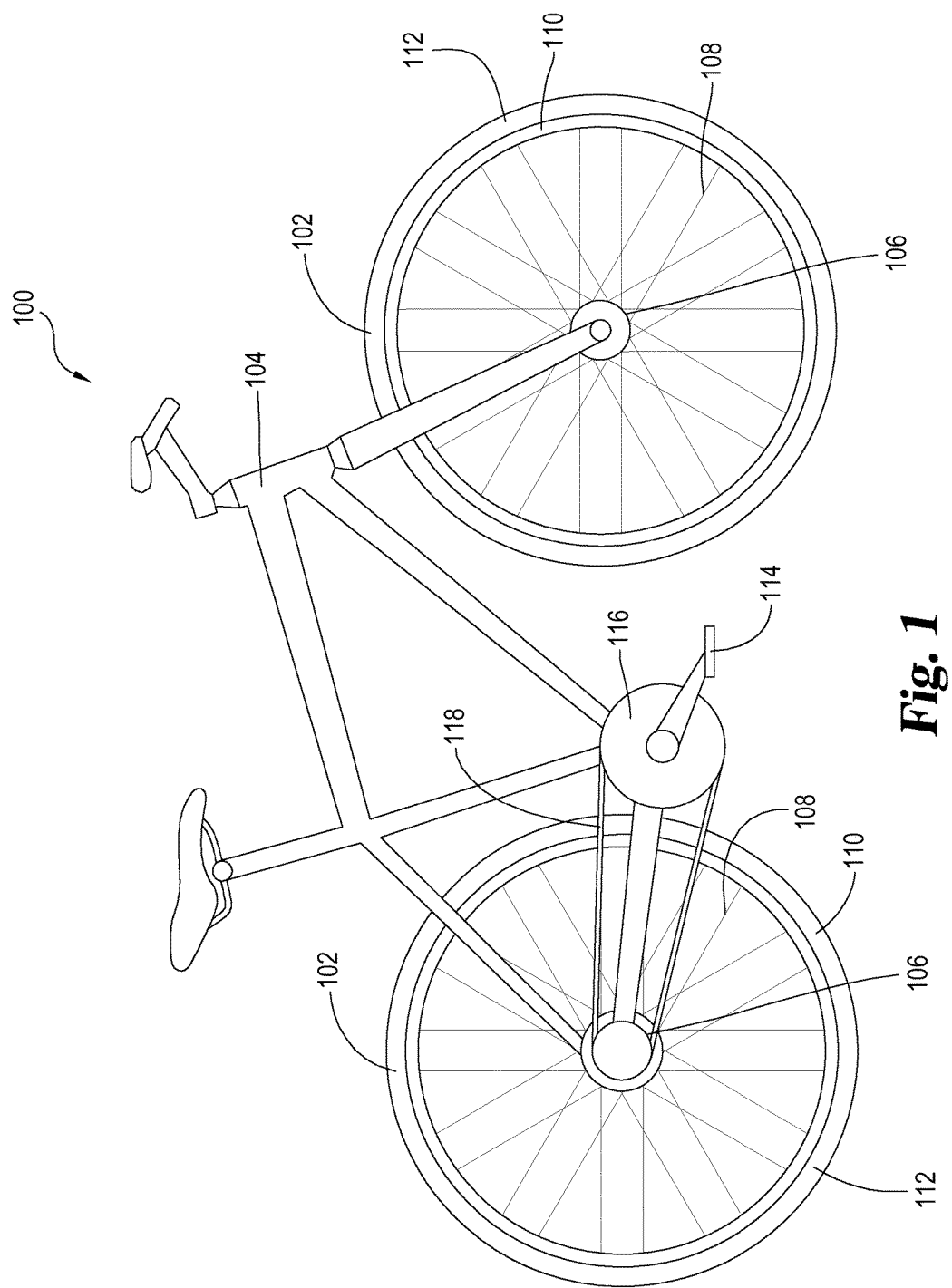
FIG. 1 is a side view of a bicycle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 shows a side view of a bicycle 100 with bicycle wheels 102 that are attached to a bicycle frame 104. Each wheel 102 includes a wheel hub 106, one or more spokes 108, a rim 110, and a tire 112 that is secured to the outer radial periphery of the rim 110. It should be recognized that the hubs 106 via axles are rotatably coupled to the bicycle frame 104, such as through the fork and rear dropouts. The spokes 108 extend radially outward from the hub 106 in order to connect the rim 110 to the hub 106. As will be explained below, the rims 110 are configured to reduce the risk of a flat tire caused by the wheel 102 impacting an object, such as a rock, pothole, curb, and other impediments. Typically, the spokes 108 are under tension when secured between the hub 106 and the rim 110. A rider via one or more pedals 114 and a crank assembly 116 drive a chain or belt 118 that in turn propels the bicycle 100.

Figure 2:
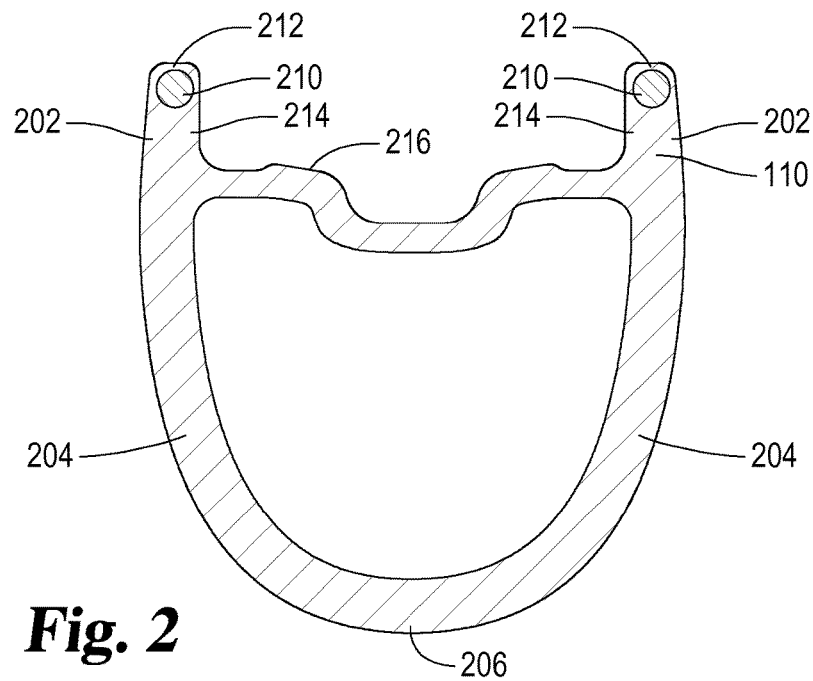
FIG. 2 is a cross-sectional view of a bicycle rim used in the FIG. 1 bicycle.
Figure 3:
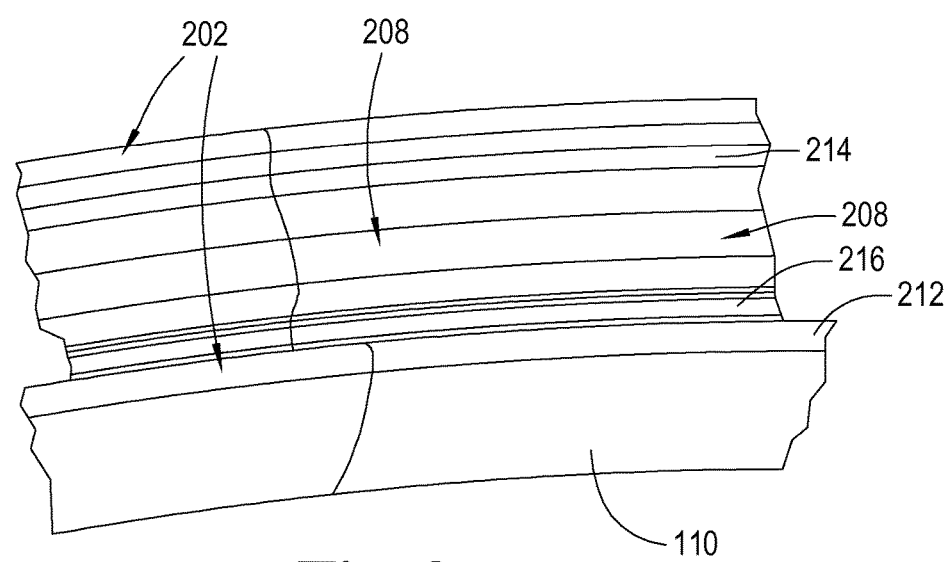
FIG. 3 is an enlarged perspective view of the FIG. 2 bicycle rim.

A cross-sectional view of the rim 110 is depicted in FIG. 2, and an enlarged perspective view of the rim 110 is shown in FIG. 3. The rim 110 in one form is a clincher type rim, but as will be explained below, this design is adaptable to other types of rims, such as tubeless type rims. The rim 110 in the illustrated example is made of composite material, and in one particular form, the rim 110 includes carbon fiber material. For the sake of clarity, the rim 110 will be described as being composed of carbon fiber material, but it should be recognized that the rim 110 can be made from one or more other types of composite materials. As depicted, the rim 110 includes leading edges 202 to which the tire 112 engages. On each side, a sidewall 204 extends from the leading edge 202 to the spoke face 206. The spoke face 206 is where the spokes 108 of the wheel 102 are attached (see, FIG. 1). Between the leading edges 202, the rim 110 has a tire channel 208 where the tire 112 is received. Inside the leading edges 202, the rims 110 include a shock absorbing member or cord 210 that is embedded inside the rim 110. The shock absorbing cord 210 is designed to elastically and/or plastically deform during an impact. In one example, the shock absorbing cord 210 is made of an elastomer material, such as rubber and/or silicone, but in other examples, the shock absorbing cord can be made of other types of shock absorbing materials. In one particular example, the cord is made of Viton® rubber (E.I. Du Pont De Nemours & Company), and in another example the cord is made of silicone rubber.

As depicted, a cover layer 212 surrounds the shock absorbing cord 210. In the illustrated example, the cover layer 212 completely surrounds the shock absorbing cord 210 such that the shock absorbing cord 210 is not exposed to the outside environment. However, in other variations, a portion of the shock absorbing cord 210 may be exposed to the outside environment. As alluded to before, the shock absorbing cord is configured to reduce flats and wheel damage caused by the wheel 102 impacting an object, such as a curb, rock, pothole, etc. In one form, the cover layer 212 is made of a stretchable and/or pliable material, such as polyester, Kevlar®, and/or fiber glass. While not certain, it is theorized that the shock absorbing cord 210 absorbs and dissipates the energy from the impact, thereby reducing the impact on the wheel. The cover layer 212 envelops the shock absorbing cord 210 so as to reduce the risk of the cord 210 being damaged and/or cut. The cover layer 212 is also able to deform along with the shock absorbing cord 210 during an impact so as to further spread and dissipate the impact load. There is a tendency with composite rims during an impact to create extremely sharp shards or broken pieces which can be quite hazardous to the rider. The cover layer 210 is able to stretch so as to keep any fractured shards or pieces retained with the rim 110 after an impact. Moreover, the cover layer 212 makes installation of the tire 112 easier because the shock absorbing cord 210 is less prone to damage and interfering with the tire. As compared to the shock absorbing cord 210, the cover layer 212 generally provides a smooth and slippery surface for the tire during mounting of the tire. By being located inside the rim 110, the shock absorbing cord 210 is also protected from adverse environmental conditions which could negatively impact the life of the shock absorbing cord 210, such as by causing cracking or weathering of the shock absorbing cord 210. The tire channel 208 is defined by opposing channel sidewall members 214, which are part of the sidewalls 204, and a channel bed 216. As shown, the shock absorbing cord 210 and cover layer 212 are located at the end opposite the channel bed 216 on the channel sidewall member.

Figure 4:
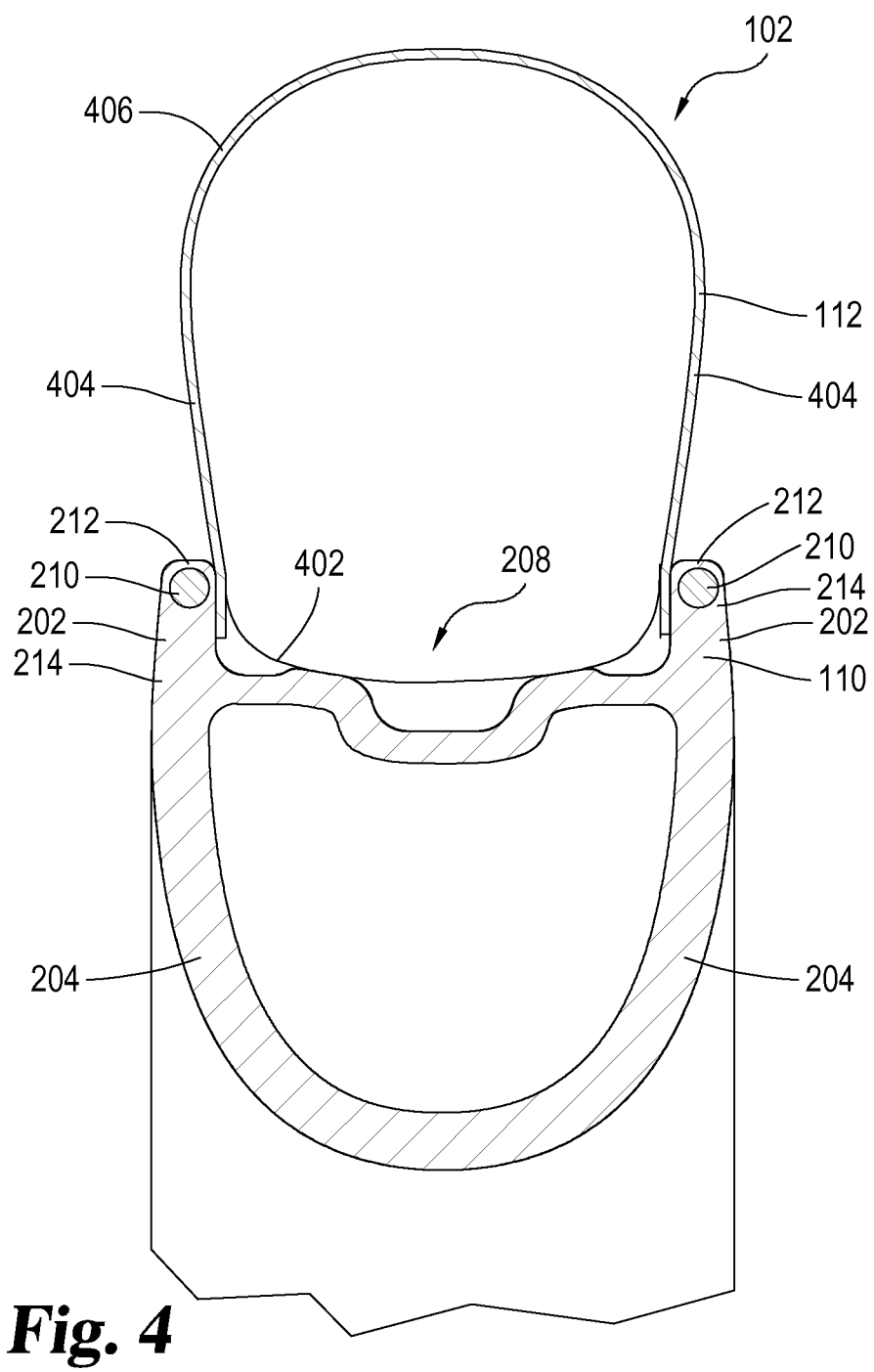
FIG. 4 is a cross-sectional view of a tire when attached to the FIG. 2 bicycle rim.

FIG. 4 shows a cross-sectional view of the tire 112 when mounted to the rim 110. In the illustrated example, an inner tube 402 is inflated inside the tire 112, but it should be recognized that in other examples, the tire 112 is a tubeless type tire (i.e., without an inner tube). The tire 112 includes tire sidewalls 404 and a tire tread portion 406. The tire sidewalls 404 press against the channel sidewall members 214 of the rim 110 when the inner tube 402 is pressurized. The channel sidewall members 214 are made of a rigid or stiff material, such as fiber reinforced materials like carbon fiber material, so as to provide adequate strength to resist the outward pressure when the tire 112 is inflated. Again, it should be recognized that installation of tire 112 is relatively easy because the tire 112 does not directly contact the shock absorbing cords 210. Moreover, the shock absorbing cord 210 does not directly contact the tire sidewalls 404 which in turn protects the shock absorbing cord 210 from being worn. The cover layer 212 is made from material that is sturdier than the shock absorbing cord 210. Again, the cover layer 212 is made from a material that is more pliable than the material used to form the channel side wall members 214 as well as the rest of the rim 110. By being pliable, the cover layer 212 is able to deform along with the shock absorbing cord 210. With the rest of the channel sidewall member 214 being relatively rigid, the channel sidewall member 214 is able to resist the outward lateral pressure created by pressurizing the tire 112 as well as create the desired ride stiffness for the wheel 102. In one form, the cover layer 212 is made of a pliable material, such as polyester, Kevlar®, and/or fiber glass, and the rest of the rim 110, including the channel sidewall members 214, is made of a carbon fiber material. During a typical wheel impact, there is a tendency for the tire to dislodge or otherwise separate from the rim which in turn can lead to a catastrophic crash. During impact testing, it was unexpectedly discovered that in some cases the shock absorbing cord 210 along with the cover layer 212 plastically deform so as to create a lip that in turn helps to retain the tire 112 during an impact.

Figure 5:
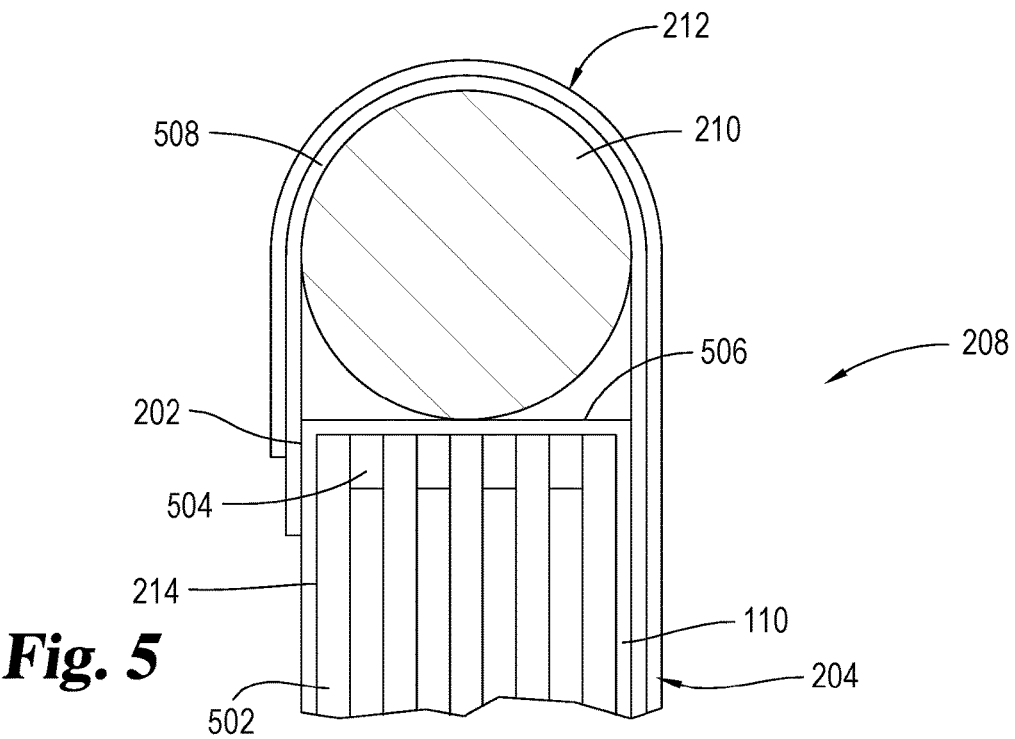
FIG. 5 is an enlarged cross-sectional view of one leading edge of the FIG. 2 bicycle rim.

An enlarged cross-sectional view showing the layering of the plies and elastic cord 210 forming the sidewall 204 during manufacturing is illustrated in FIG. 5. As shown, the channel sidewall member 214 is formed at least in part by one or more layers of sidewall plies 502 and sidewall tows 504. The sidewall plies 502 and tows 504 are oriented with their edges oriented in an alternating and/or offset manner for adjacent layers so as to enhance the strength of the sidewall 204. One or more edge plies 506 cover the end edges of the sidewall plies 502 and tows 502. In the illustrated example, the channel sidewall member 214 includes a single edge ply 506, but in other examples, the channel sidewall member 214 can include more than one edge ply 506. The edge plies 506 provide a relatively smooth surface against which the shock absorbing cord 210 rests. The edge plies 506 reduce the risk of the sidewall plies 502 and tows 504 cutting into and/or otherwise damaging the shock absorbing cord 210. As illustrated, the cover layer 212 is formed by one or more cover plies 508 that are layered over the shock absorbing cord 210. The cover plies 508 are made of a material, such as polyester, fiberglass, Kevlar®, and/or aramid materials, that is more stretchable, pliable, and/or extendable than the material used to form the sidewall plies 502 and sidewall tows 504. As depicted, the cover plies 508 in one example extend into the tire channel 208 so as to provide proper overlap during manufacturing, but in other examples, the cover plies 508 are shorter and extend only a sufficient distance to cover the shock absorbing cord 210. In one example, the sidewall plies 502, sidewall tows 504, and edge plies 506 are made of composite material, such as carbon fiber materials, so as to be lightweight, rigid, and strong. In this example, the cover plies 508 are made of a material that is more stretchable, pliable, and/or extendable than theses carbon fiber materials, such as polyester, fiberglass, Kevlar®, and/or aramid materials. In another example, the sidewall plies 502 and tows 504 are made of composite materials, particularly carbon fiber materials, and the edge plies 506 are made of the same or similar material used to form the cover layer 212.

During manufacturing, sidewall plies 502 and tows 504 along with the edge plies 506 are layered in a mold shaped like the rim 110. The shock absorbing cord 210 is wrapped around on the edge plies 506, and the cover plies 508 are layered over the shock absorbing cord 210 in the manner shown in FIG. 5. The fibers in the various plies are aligned to provide the desired strength and stiffness for the rim 110. In one form, the materials are prepreg materials so no additional epoxy is required, and in another form, epoxy is poured into the mold and/or otherwise applied to the various layers. The mold is then is heated and/or air-cured. Once cured and cooled, if needed, the rim 110 is removed from the mold for further processing.

Figure 6:
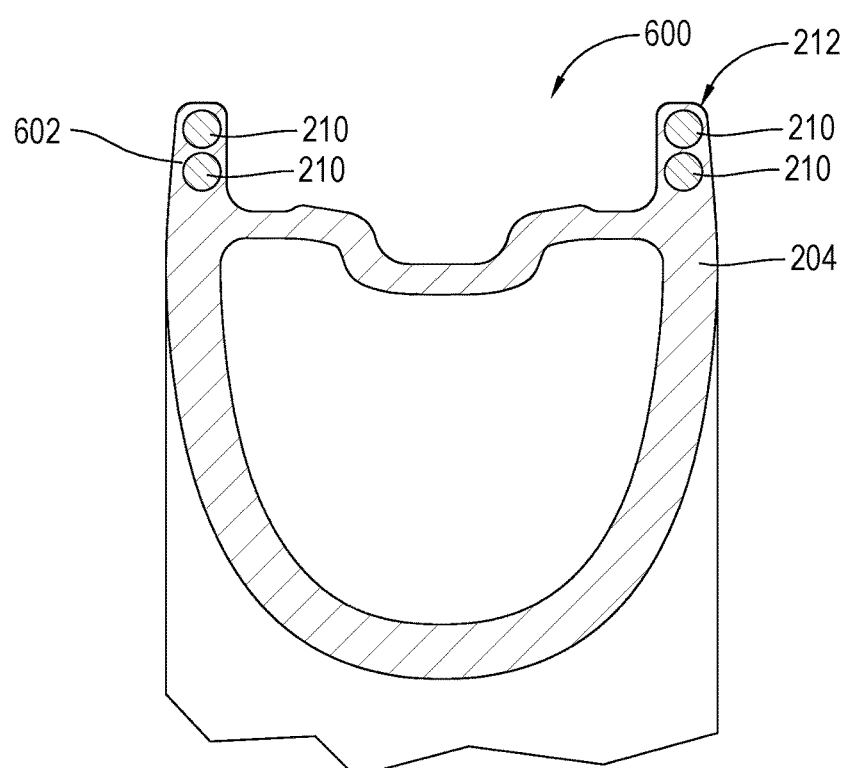
FIG. 6 is a cross-sectional view of a bicycle rim including two shock absorbing cords in each leading edge.
Figure 7:
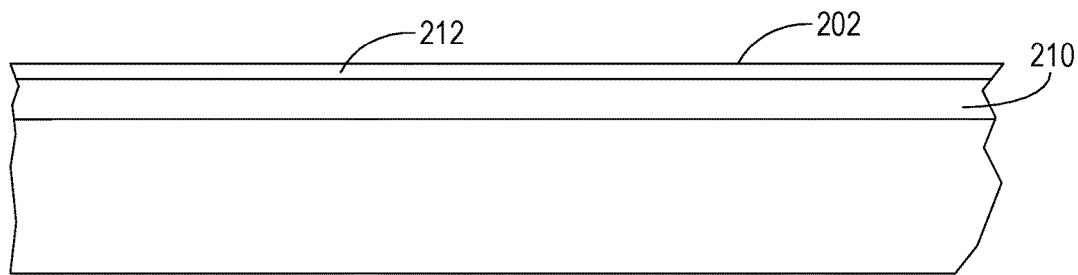
FIG. 7 is an enlarged side cross-sectional view of a leading edge with a shock absorbing cord in the form of a continuous cord.
Figure 8:
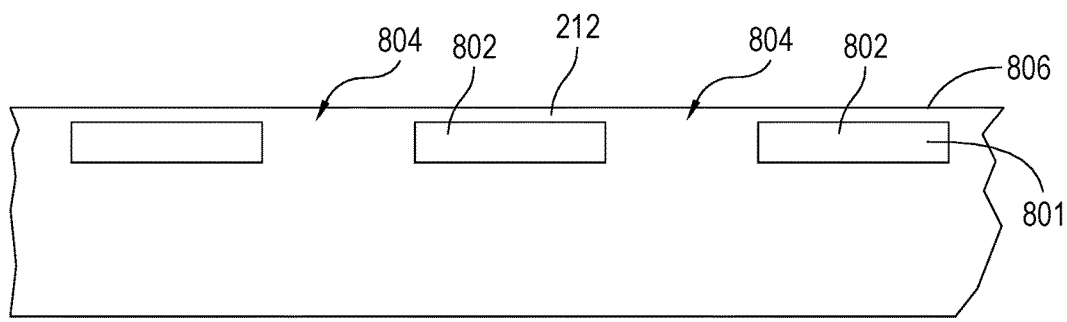
FIG. 8 is an enlarged side cross-sectional view of a leading edge with a shock absorbing cord in the form of a discontinuous cord.
Figure 9:
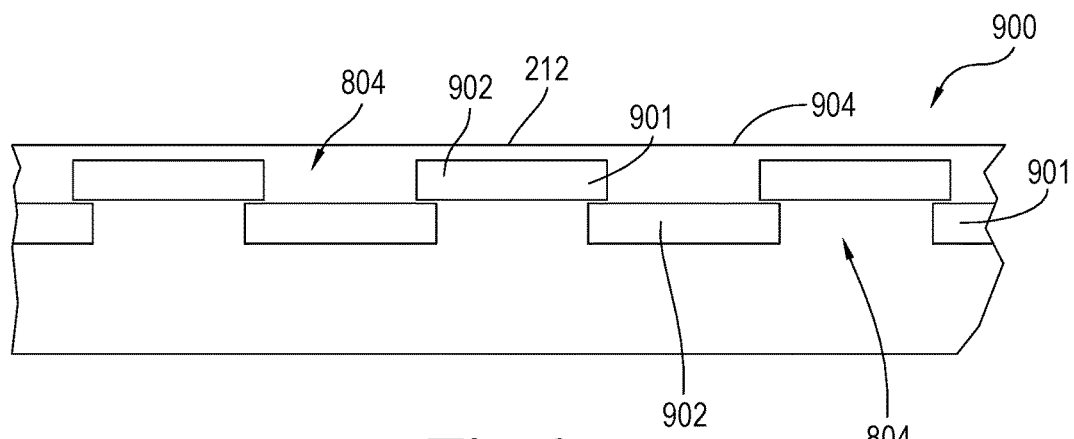
FIG. 9 is an enlarged side cross-sectional view of a leading edge with a shock absorbing cord in the form of a series of discontinuous, alternating cords.

The shock absorbing cord 210 can be configured differently in other examples. For example, FIG. 6 shows a cross-sectional view of a rim 600 that includes two shock absorbing cords 210 inside a leading edges 602 of each sidewall 204. As depicted, the cover layer 212 covers the cords 210 at each sidewall. In one form, the two shock absorbing cords 210 in each sidewall are made from the same material, but in other forms, the shock absorbing cords 210 are made from different materials so that the shock absorbing cords 210 have different elastic, chemical, and/or physical properties. In one example, the shock absorbing cord 210 closer to the leading edge 602 is more elastic than the one farther away from the leading edge 602. Inside the rims, the shock absorbing cords 210 can be continuous, such as is depicted in FIG. 7, and/or discontinuous, such as shown in FIG. 8. Looking at FIG. 8, a shock absorbing cord 801 is formed by discrete elastic segments 802 that are separated by gaps 804 in leading edge 806. FIG. 9 shows an enlarged, partial cross-sectional side view of a rim 900 with a shock absorbing cord 901 in the form of two or more rows of alternating discrete segments 902 with gaps in between. In leading edge 904, the discrete segments 902 in the rows can have the same elastic properties or different elastic properties.

Figure 10:
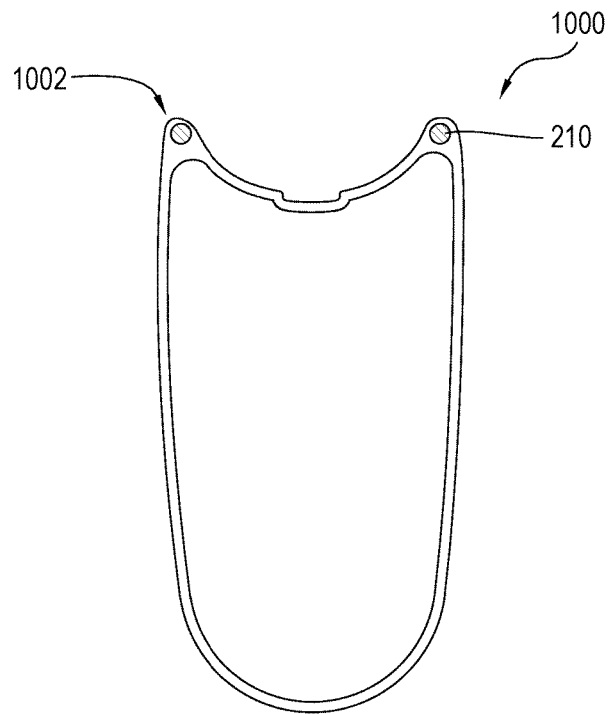
FIG. 10 is a cross-sectional view of a tubular type bicycle rim incorporating shock absorbing cords.
Figure 11:
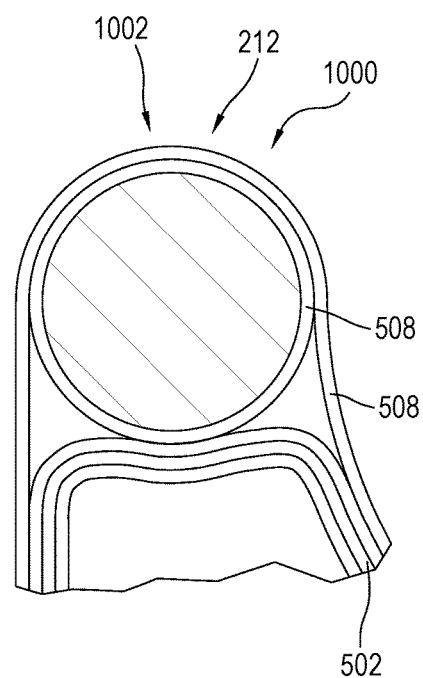
FIG. 11 is an enlarged cross-sectional view of the leading edge for the FIG. 10 rim.

The shock absorbing cords 210 can be incorporated into other types of rims. For example, FIG. 10 shows a cross-sectional view of a sew-up or tubular tire rim 1000 with the shock absorbing cords 210 located inside leading edges 1002 of the rim 1000. FIG. 11 shows an enlarged cross-ssectional view of one of the leading edges 1002 in the FIG. 10 rim 1000. As shown, the shock absorbing cord 210 is disposed one or more layers of the sidewall plies 502. The cover layer 212 is formed by one or more the cover plies 508. In the illustrated example, one of the cover plies 508 is wrapped completely around the circumference of the shock absorbing cord 210. Another of the cover plies 508 covers and secures the shock absorbing cord 210 to the sidewall plies 502.

Figure 12:
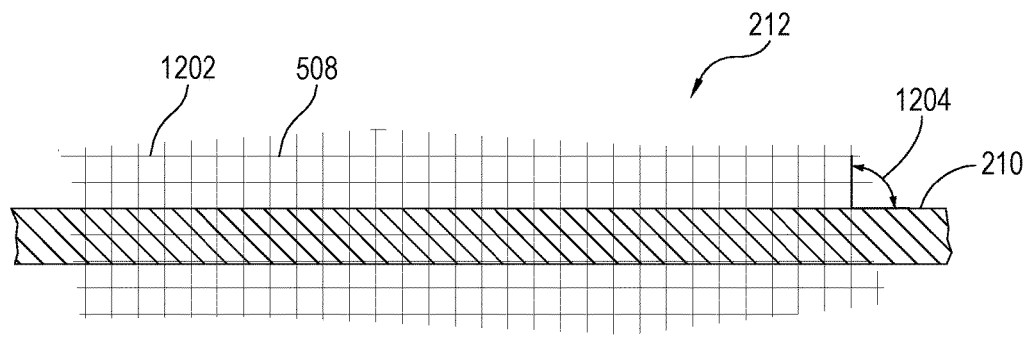
FIG. 12 is an enlarged view of a cover layer applied over a shock absorbing cord with the fibers extending generally parallel or perpendicular to the shock absorbing cord.

FIG. 12 shows an enlarged view of the cover layer 212 applied over the shock absorbing cord 210. The cover ply 508 in this example includes fibers 1202 that are woven together. As can be seen, some of the fibers 1202 extend parallel to the shock absorbing cord 210, while other fibers 1202 extend transverse to or perpendicular to the shock absorbing cord 210. The fibers 1202 extending perpendicular or transverse to the shock absorbing cord 210 form an angle 1204 relative to the shock absorbing cord 210. In the illustrated example, this angle 1204 is generally 90°.

Figure 13:
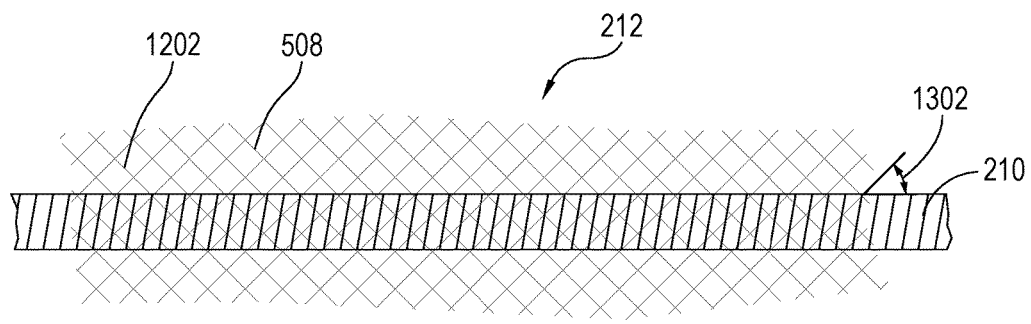
FIG. 13 is an enlarged view of a cover layer applied over a shock absorbing cord with the fibers extending at a 45° angle relative to the shock absorbing cord.

It should be recognized however that the fibers 1202 can be oriented at other angles. For example, FIG. 13 shows an enlarged view of the cover letter layer 212 with the fibers 1202 of the cover ply 508 oriented at an acute angle relative to the shock absorbing cord 210, as is indicated by angle 1302. Having the fibers 1202 oriented in such a manner relative to the shock absorbing cord 210 may help further minimize the effects of an impact on the rim. For instance, with the fibers 1202 having such an orientation, the fibers 1202 may be less prone to cut into or otherwise damage the cord 210 during an impact. As a result, the integrity of the rim may be better maintained during an impact. In one particular example, the angle 1302 of the fibers 1202 is around 45°, but this angle 1302 can be different in other examples.

Figure 14:
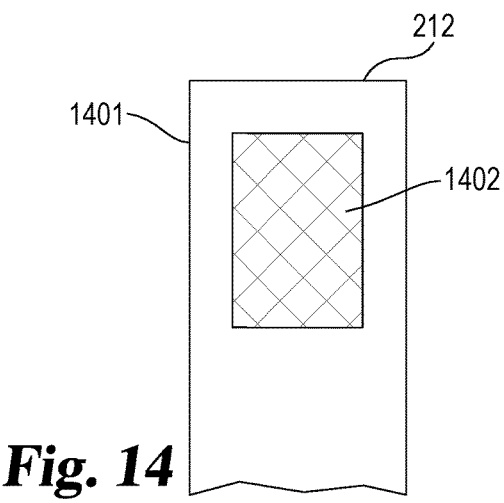
FIG. 14 is an enlarged cross-sectional view of a leading edge of a bicycle rim with a shock absorbing cord having a rectangular cross-sectional shape.

As alluded to before, the shock absorbing cord 210 can have other cross-sectional shapes besides a circular cross-sectional shape. FIG. 14 shows a cross-sectional view of a leading edge 1401 of a rim with a shock absorbing cord 1402 having a generally rectangular cross-sectional shape. With the shock absorbing cord 1402 having a generally rectangular shape, the cover layer 212 can generally coincide with this rectangular shape so that the leading edge 202 likewise has a generally rectangular shape. In other examples, the shock absorbing cord 1402 can have other shapes.

Glossary of Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Bicycle" is used in the broader or more generic sense to generally refer to a human powered land vehicle that includes one or more wheels. The term "bicycle" can refer to a vehicle having two wheels, but it also refers to vehicles having one wheel (i.e., a unicycle), three wheels (i.e., a tricycle), or even more wheels.

"Carbon Fiber Material" refers generally to a type of fiber reinforced material that includes, but is not limited to, a material of thin, strong crystalline filaments of carbon, used as a strengthening material, such as in resins and ceramics. For example, carbon fiber materials include strong lightweight synthetic fibers made especially by carbonizing a fiber at high temperatures.

"Composite Material" refers generally to any material including a fiber reinforcement and an encapsulating matrix. A fiber (a fiber or fiber tow typically includes a bundle of filaments) is generally considered to be continuous if the fiber extends from one edge of a ply of material to another edge, most often the opposing edge. While all fibers in a composite material need not be continuous, a substantial majority of the fibers will be continuous in some examples.

"Couple" or "coupled" refers generally to an indirect and/or direct connection between the identified elements, components, and/or objects. Often the manner of the coupling will be related specifically to the manner in which the two coupled elements interact.

"Embed" generally refers to closely enclosing or surrounding something inside another object or substance.

"Fiber Reinforced Material" refers generally to any material including fibers of high strength and modulus embedded in or bonded to a matrix with distinct interfaces (boundary) between them.

"Laminate" refers generally to a plurality of plies that have been stacked (or laid) one on top of another. As used herein, the term refers to both the plurality of plies before curing and/or consolidation, as well as after consolidation as is apparent from the term's use in context. The orientations of the fibers of each particular layer may vary relative to the orientations of the fibers in other layers to create a consolidated laminate having desired strength and stiffness characteristics in various directions. By utilizing and tailoring plies with differently orientated fibers, a composite material's designer or engineer can tailor the mechanical properties of an advanced composite laminate to withstand the forces that the laminate is likely to encounter during use.

"Leading Edge" generally refers to one of two edges of the rim that holds the sidewall of the tire and forms part of the wheel bed securing the tire to the rim. Such edge may take the form of a flange in the case of traditional clincher type wheels or may take the shape of a shallow lip that forms a cusp where the tire lies for tubular or sew-up rims.

"Ply" refers generally to a single layer of high strength continuous fibers aligned in a common orientation, or in the case of a fabric in two and possibly three, four, or more orientations. One of the most common plies utilized in composite materials is where substantially all the fibers in the ply are aligned in a single direction. A "ply" may also be referred to as a layer. A ply can include a prepreg or a single sheet of dry fabric or dry sheet of unidirectional fibers often held together with a small number of bias threads or fibers. In other examples, the fibers in the ply can be woven into cloth. For instance, the fibers can be woven into any number of patterns, including, but not limited to, twill, satin, plain, unidirectional, bidirectional, triaxial, and quadaxial patterns, to name just a few.

"Prepreg" is short for Preimpregnated cloth and refers generally to a ply of composite material including one or more types of reinforcing fiber at least partially impregnated and/or encapsulated with a resin. When the resin is a thermoset, the resin is not fully cured and typically requires the application of heat to complete cure. When the resin is a thermoplastic, the resin is typically a solid that melts and flows under the application of heat and pressure to further encapsulate the fibers as well as join adjacent plies of material together. For example, the prepreg can include carbon fiber, fiber glass, Kevlar®, etc. that is pre wetted with an epoxy. Examples of prepreg can include wet prepreg cloth or dry prepreg cloth.

"Rim" generally refers to the outer portion of a wheel that holds the tire (which represents the leading edge of an airfoil shape of the rim) on the outer surface and spokes through spoke holes of an inner surface (which then becomes the trailing edge of the airfoil shape). Note that embodiments described herein may refer to either the wheel or rim, and thus the terms become interchangeable; however, when used in a claim the term "rim" does not include the tire, spokes, and or hub assembly unless otherwise claimed.

"Shock Absorbing Cord" generally refers to a flexible member, such as in the form of a strip, string, or rope that is able to elastically and/or plastically deform during an impact. The shock absorbing cord can be a solid piece of material or made of multiple pieces of material woven, layered, and/or otherwise joined together. The shock absorbing cord can be made from a single type of material or multiple materials. In one example, the shock absorbing cord has a circular cross-sectional shape, but in other examples, the shock absorbing cord can have different cross-sectional shapes, such as rectangular, triangular, elliptical, hexagonal, and/or irregular cross-sectional shapes, just to name a few examples. The shock absorbing cord can also have continuous or discrete sections with gaps in between. The shock absorbing cord can be made of material that plastically and/or elastically deforms during an impact. In one particular example, the shock absorbing cord is made from natural rubber, synthetic rubber, and/or silicone rubber, but it should be recognized that the shock absorbing cord can be made from other materials that are able to elastically and/or plastically deform during an impact.

"Spoke Face" generally refers to the surface of the rim where a spoke of a wheel extends for attachment to the hub.

"Tow" refers to a bundle of continuous strands or filaments, such as man-made fibers (e.g., carbon fibers). Strands are then bundled together to create a tow. A "rolled tow" refers to a specific type of bundled fibers in which the fibers are twisted (or rolled) within the bundle. In other examples, the fibers in the tow are untwisted.

"Wheel" generally refers to an outer circular rim that holds the tire along with the spoke and hub assembly; however, based on the embodiment described, a wheel and rim may be used herein interchangeably.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top", "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An apparatus, comprising:
   a bicycle rim including
      a leading edge that is at least in part made of a composite material,
      a shock absorbing cord embedded inside the leading edge, wherein the leading edge completely surrounds the shock absorbing cord, wherein the shock absorbing cord is made of a single material that is able to plastically and/or elastically deform more than the composite material, and
   wherein the leading edge is a lateral edge of the rim that defines one lateral side of a wheel bed in which a tire is received.

2. The apparatus of claim 1, wherein the composite material includes carbon fiber material.

3. The apparatus of claim 1, wherein the shock absorbing cord is at least in part made of rubber.

4. The apparatus of claim 1, wherein the rim further includes a cover layer covering the shock absorbing cord.

5. The apparatus of claim 4, wherein the cover layer is more stretchable than the composite material.

6. The apparatus of claim 5, wherein the cover layer is made of material selected from a group consisting of polyester, fiberglass, and aramid materials.

7. The apparatus of claim 4, further comprising:
   the rim including
      a spoke face,
      a sidewall extending from the leading edge to the spoke face, and
      a tire channel defined between the sidewalls; and
   a tire received in the tire channel, wherein the cover layer contacts the tire, wherein the cover layer is located between the shock absorbing cord and the tire.

8. The apparatus of claim 4, wherein the cover layer has fibers oriented at 45 degrees relative to the shock absorbing cord.

9. The apparatus of claim 1, wherein the rim further includes a second shock absorbing cord embedded in the leading edge.

10. The apparatus of claim 1, wherein the shock absorbing cord extends in a continuous manner around the rim.

11. The apparatus of claim 1, wherein the shock absorbing cord extends in a discontinuous manner around the rim.

12. The apparatus of claim 1, wherein the rim is a clincher type rim.

13. The apparatus of claim 1, wherein the rim is a tubeless type rim.

14. The apparatus of claim 1, further comprising:
   a hub; and
   one or more spokes connecting the rim to the hub.

15. The apparatus of claim 14, further comprising:
   a tire secured to the rim; and
   a bicycle attached to the hub.

16. A method, comprising:
   layering one or more plies of fiber reinforced material;
   placing a shock absorbing cord on the plies of the fiber reinforced material, wherein the shock absorbing cord is made of material that is able to plastically and/or elastically deform more than the fiber reinforced material, wherein the shock absorbing cord is located at a position corresponding to a leading edge of a bicycle rim, wherein the leading edge is a lateral edge of the bicycle rim that defines one lateral side of a wheel bed in which a tire is received;
   covering the shock absorbing cord with a cover layer, wherein the cover layer is made of a material more stretchable than the fiber reinforced material;
   wherein the cover layer completely surrounds the shock absorbing cord on the leading edge during said covering; and
   forming the one or more plies into the bicycle rim.

17. The method of claim 16, further comprising curing the one or more plies.

18. The method of claim 16, wherein said covering includes covering the shock absorbing cord with a cover ply having fibers oriented at a 45 degree angle relative to the shock absorbing cord.

19. The method of claim 16, further comprising:
   applying epoxy to the plies of the fiber reinforced material; and
   curing the epoxy after said applying.

20. The method of claim 16, further comprising:
   wherein the plies of the fiber reinforced material includes prepreg material; and
   curing the prepreg material after said covering the shock absorbing cord with the cover layer.

21. The method of claim 16, wherein the cover layer is made of material selected from a group consisting of polyester, fiberglass, and aramid materials.

22. The method of claim 21, wherein the fiber reinforced material includes carbon fiber material.

23. An apparatus, comprising:
a bicycle rim including
 a first leading and a second leading edge each of which being located at an outer radial periphery of the rim, the first and second leading edges defining therebetween a tire channel where sidewalls of a tire are secured, wherein the first and second leading edges are each at least in part made of a composite material, and
 a first shock absorbing cord and a second shock absorbing cord each of which being made of rubber, wherein the first shock absorbing cord is embedded inside the first leading edge, wherein the first leading edge completely surrounds the first shock absorbing cord, wherein the second shock absorbing cord is embedded inside the second leading edge, wherein the second leading edge completely surrounds the second shock absorbing cord, wherein the first and second shock absorbing cords are positioned where the tire channel is disposed between the first and second shock absorbing cords.

24. The apparatus of claim 23, wherein the composite material includes carbon fiber material.

25. The apparatus of claim 24, wherein:
 the first leading edge has a cover layer covering the first shock absorbing cord; and
 the cover layer is more stretchable than the carbon fiber material.

26. The apparatus of claim 25, wherein:
 the cover layer is exposed to an outside environment on the first leading edge; and
 the cover layer directly contacts and covers the first shock absorbing cord in the first leading edge.

27. The apparatus of claim 25, wherein the cover layer has fibers oriented at 45 degrees relative to the first shock absorbing cord of the first leading edge.

28. The apparatus of claim 23, wherein the rim is a clincher type rim.

29. The apparatus of claim 23, wherein the rim is a tubeless type rim.

* * * * *